Patented Mar. 26, 1935

UNITED STATES PATENT OFFICE 1,996,036

TREATMENT OF RUBBER

William F. Tuley, Nutley, N. J., assignor, by mesne assignments, to United States Rubber Company, New York, N. Y., a corporation of New Jersey No Drawing. Application August 11, 1932, Serial No. 628,295

3 Claims. (Cl. 106—23)

This invention relates to improvements in the treatment of rubber and particularly to improvements in the plastication of rubber and rubber-like materials.

An object of this invention is to provide a method of increasing the rate of breakdown of crude rubber during mastication by means of the usual masticating machinery. Another object is to provide a process whereby a softer broken down rubber may be produced in a given time by mastication than is possible under the usual conditions for mastication. Another object is to provide a process of breaking down crude rubber whereby substantial savings in time, labor, power consumption, and equipment costs may be realized. A further object is to provide a process whereby the output of a given masticating equipment may be substantially increased. A still further object is to provide a softened or broken-down crude rubber having desirable physical properties. Other objects will be apparent from the following description.

It is customary to plasticize crude rubber on a roll mill or in an internal grinder before mixing in the compounding ingredients, such as fillers, pigments, and vulcanizing ingredients such as accelerators, sulphur, etc. The operation normally requires from 30–40 min. to several hours, depending on the softness desired, and is carried out either continuously, or intermittently with intervening rest periods. So called "softeners" such as fatty acids, oils, and tars, usually considered indispensible in factory compounding, when added to crude rubber on the mill actually decrease the degree of breakdown which can be produced in a given length of time, and in many cases, such as tire tread stocks, it has been found that oils such as palm oil and pine tar produce decreased resistance to abrasion of the vulcanized tread. The main purpose of such "softeners" is to facilitate the incorporation of dry fillers, and to facilitate subsequent calendering or tubing operations, by virtue of their lubricating properties. Further, rubber broken down in the usual manner and compounded with fillers and oils etc. tends to harden upon standing and hence in many cases is "cracked" or broken down a second time before further processing. This hardening effect is due to the thixotropic nature of the mass and is distinct from the hardening due to cooling of the rubber. Thixotropic hardening of the rubber stock is substantially avoided by the present invention.

Accordingly the invention broadly comprises treating crude rubber during the preliminary breakdown or masticating period with a reagent to increase the rate of breakdown of the rubber, said reagent being selected from the group consisting of lead dioxide and lead sesquioxide ($Pb_3O_4$), and said treatment being carried out prior to the incorporation of the usual compounding and/or vulcanizing ingredients.

Manganese dioxide and the true metal peroxides such as those of sodium, barium, zinc, etc. strangely do not, when added to crude rubber, produce the effects resulting from the use of the aforementioned reagents.

The reagent is incorporated in the rubber, substantially as soon as it has been masticated to a coherent mass or sheet, which condition is usually reached after a few minutes of preliminary mastication. Mastication is continued after adding the reagent or reagents, or the further mastication may be delayed until further processing of the rubber is desired. Generally, the compounding and/or vulcanizing ingredients should not be added until the rubber has reached the desired degree of softness. Certain materials tend to destroy the plasticizing powers of the reagents and should not be added to the rubber during the breakdown; for example, sulphur readily reacts upon the lead dioxide to destroy its plasticizing action.

The reagents may be used in various amounts but it is preferred to use them in quantities from about 0.25% to about 1.0% of the weight of rubber used. It is to be understood that larger amounts of the reagents may be used, and trial will determine the proper amount for the desired result.

The prefered temperature range within which the rubber is treated is the range commonly employed in the breaking down of crude rubber, that is, from about 140° to about 200° F., although higher temperatures may be used, if desired, for example temperatures as high as 260° F. have been used with satisfactory results. The effects of the process are less noticeable when the process is carried out with the temperature of the rubber much below 140° F.

In order to obtain the benefits of the invention, such as reduced power demands, to the fullest degree, it is preferable also to carry out the preliminary working of the rubber, prior to the incorporation of the breakdown-accelerating reagent, on or in a preheated mill rather than to start with a "cold" mill.

Under the conditions of the present process, the reagent is decomposed during the plasticizing process, and substantially no undecomposed reagent is present during the subsequent operations of compounding and vulcanizing; for example a portion of rubber which had been plasticized with the aid of lead dioxide according to the present invention, was submitted to a delicate test for traces of lead dioxide and was found to contain none. It is evident that the reagent becomes reduced during the process, most probably to the divalent stage represented by lead monoxide or corresponding lead salts.

The plasticities as given in the examples below, represent the relative viscosities of the respective rubber samples and were determined by measuring the relative resistance of the samples to simple shearing stress at a constant average rate of shear and at a temperature of 212° F.

The invention is illustrated as follows, the parts and percentages being by weight:

Example 1.—A quantity of smoked sheet was blended by milling for three minutes, and was then divided into portions of 600 grams each. As a control, one such portion was then milled for 8 min. at 200° F. without the addition of any reagent. To each of two other portions respectively reagents were added as indicated in Table I and the treated portions were then each milled for 8 min. at 200° F. Samples of each of the portions were taken just prior to and also at the completion of the 8 min. milling period and the plasticity of each sample was determined. The results are given in Table I:

TABLE I

| Chemical reagent | Percent of rubber | Plasticity Initial | Plasticity After 8 min. milling at 200° F. | Percent decrease in viscosity |
|---|---|---|---|---|
| A. None | | 71.5 | 70.5 | 1.4 |
| B. Lead dioxide | 0.5 | 71.5 | 60.5 | 16.0 |
| C. Lead dioxide | 1.0 | 71.5 | 56.5 | 21.0 |

It is obvious from the above data that the treated portions B and C underwent a very substantial softening during a period of time in which the plasticity of the control portion A remained practically constant.

Example 2.—A tire tread mix B was prepared in which the rubber used was smoked sheets which had previously been broken down with the aid of 0.5% of lead dioxide according to the present invention. The usual "softeners" were omitted from this mix. Another mix A was prepared according to the same basic formula but employing smoked sheets broken down in the ordinary manner. To mix A were also added the necessary amounts of "softeners" according to common practice, pine tar and palm oil being used in this instance. The amount of vulcanization accelerator was adjusted so as to give the same rate of cure in both mixes. Determinations were made of the plasticities of the respective broken-down rubbers before compounding, and of the compounded mixes. Slabs of each mix were press cured, and the tensile strength and the relative resistance to abrasion of the vulcanizates was measured, the results being shown in Table II. The two mixes had the following compositions:

| | A | B |
|---|---|---|
| Ordinary broken-down smoked sheets | 100 | |
| Treated rubber | | 100.5 |
| Carbon black | 50 | 50 |
| Pine tar | 5 | |
| Palm oil | 1 | |
| Zinc oxide | 2 | 2 |
| Zinc soaps of cocoanut oil acids | 3 | 3 |
| Methylated polyethylene polyamines (accelerator) | 1.1 | 1.0 |
| Acetone-diphenylamine condensate (antioxidant) | 1.25 | 1.25 |
| Sulphur | 3.5 | 3.5 |

TABLE II

Plasticity

| | A | B |
|---|---|---|
| Broken-down rubber (before compounding) | 73.5 | 60.0 |
| Compounded mix | 49.5 | 50.5 |

Tensile strength (lbs./sq. in.)

| Cure | A | B |
|---|---|---|
| 45 min. at 45 lbs | 3840 | 3981 |
| 60 min. at 45 lbs | 3780 | 3907 |
| 75 min. at 45 lbs | 3570 | 3675 |
| 90 min. at 45 lbs | 3590 | 3600 |

Relative abrasion resistance

| Cure | A | B |
|---|---|---|
| 45 min. at 45 lbs | 86 | 111 |
| 60 min. at 45 lbs | 100 | 112 |
| 75 min. at 45 lbs | 116 | 140 |
| 90 min. at 45 lbs | 119 | 151 |
| Average relative value | (100%) | 122% |

It will be seen that the omission of the usually indispensable "softeners" from mix B, made possible by this invention, results in a superior vulcanized product, particularly in respect to its resistance to abrasion.

The invention is applicable to all commercial types of crude rubber, and is particularly advantageous in the treatment of the higher grades of rubber, such as fine para, crepes, smoked sheets, spray dried rubbers, etc.

With the detailed disclosure above given, it is obvious modifications will suggest themselves, without departing from the principle of the invention, and it is not desired to limit the invention otherwise than as set forth in the appended claims.

Having thus described my invention, what I claim and desire to protect by Letters Patent is:

1. A process of breaking down crude rubber prior to the addition of compounding and/or vulcanizing ingredients which comprises adding to the crude rubber a compound selected from the group consisting of lead dioxide and lead sesquioxide, in an amount sufficient to reduce the viscosity of the rubber and milling the rubber for a time and at a temperature sufficient to produce a decrease in viscosity.

2. A process of breaking down crude rubber prior to the addition of compounding and/or vulcanizing ingredients which comprises adding to the crude rubber a compound selected from the group consisting of lead dioxide and lead sesquioxide, in an amount sufficient to reduce the viscosity of the rubber and milling the rubber for a time and at a temperature sufficient to produce a decrease in viscosity and to decompose the added reagent so that substantially no trace of it remains.

3. A plasticized and broken down crude rubber product substantially identical with the product produced as set forth in claim 2, said product having substantially no tendency to undergo thixotropic hardening.

WILLIAM F. TULEY.